United States Patent [19]

Katoozi et al.

[11] Patent Number: 5,144,230
[45] Date of Patent: Sep. 1, 1992

[54] METHOD AND SYSTEM FOR TESTING INTEGRATED CIRCUITS BY CYCLE STEALING

[75] Inventors: Mehdi Katoozi, Bellevue; George S. LaRue, Redmond, both of Wash.

[73] Assignee: The Boeing Company, Seattle, Wash.

[21] Appl. No.: 618,050

[22] Filed: Nov. 26, 1990

[51] Int. Cl.$^5$ .................... G01R 15/12; G06F 11/00
[52] U.S. Cl. ................. 324/158 R; 324/73.1; 371/22.6
[58] Field of Search ............ 324/158 R, 73.1, 158 F; 371/22.4, 22.6, 15.1, 68.2, 27, 25.1; 437/8

[56] References Cited

U.S. PATENT DOCUMENTS

| | | | |
|---|---|---|---|
| 3,471,686 | 10/1969 | Connell | 371/68.2 |
| 3,631,229 | 12/1971 | Bems et al. | 371/22.6 |
| 4,038,641 | 7/1977 | Bouknecht et al. | 364/900 |
| 4,038,642 | 7/1977 | Bouknecht et al. | 364/900 |
| 4,053,950 | 10/1977 | Bourke et al. | 364/200 |
| 4,155,116 | 5/1979 | Tawfik et al. | 364/119 |
| 4,181,934 | 1/1980 | Marenin | 364/200 |
| 4,417,304 | 11/1983 | Dinwiddle, Jr. | 364/200 |
| 4,451,884 | 5/1984 | Heath et al. | 364/200 |
| 4,470,109 | 9/1984 | McNally | 364/200 |
| 4,479,179 | 10/1984 | Dinwiddie, Jr. | 364/200 |
| 4,534,011 | 8/1985 | Andrews et al. | 364/900 |
| 4,628,443 | 12/1986 | Richard et al. | 371/22.6 |
| 4,724,380 | 2/1988 | Burrows et al. | 324/158 R |
| 4,785,453 | 11/1988 | Chandran et al. | 371/68 |
| 4,839,895 | 6/1989 | Makita | 371/16 |

FOREIGN PATENT DOCUMENTS 0140814 8/1983 Japan .

*Primary Examiner*—Vinh Nguyen
*Attorney, Agent, or Firm*—Christensen, O'Connor, Johnson & Kindness

[57] ABSTRACT

A system for performing a self test on a circuit without interrupting its normal function. Several embodiments of a self-test system (10, 60, 80, 100, 120) are disclosed, each of which include a test generator (22) that generates a test signal selectively applied to a circuit under test (CUT) (12, 122). The CUT produces an output signal that is analyzed to determine whether the circuit is operating properly. In several of the embodiments, a signature analyzer (44) compares the signature of the output signal to a predetermined expected signature after a sequence of test vectors have been performed on the CUT. In a fault-tolerant embodiment of the self-test system (100), a plurality of CUTs are evaluated in respect to the output signal produced thereby, both when operating to process a normal input signal and, when processing a test signal. A voter (108) selects an output signal for use by a primary signal utilization device (42) from among the output signals of the redundant CUTs and thus determines whether one of the redundant circuits has failed to operate properly. In each embodiment, the self test can occur either during multiple system clock cycles when the circuit is available, or during a portion of each system clock cycle in which the circuit under test is not required to perform its normal function. In another embodiment involving a first circuit portion (124) that produces an intermediate data state that must be held between successive clock cycles for use by a second circuit portion (126), a latch (130) is used to bypass a latch (128) within the circuit under test, so that both portions of the circuit are evaluated without disrupting operation of the signal utilization device.

21 Claims, 5 Drawing Sheets

METHOD AND SYSTEM FOR TESTING INTEGRATED CIRCUITS BY CYCLE STEALING

TECHNICAL FIELD

This invention generally pertains to a method and apparatus for testing the operation of integrated circuits, and more specifically, for self testing such circuits while they remain in service.

BACKGROUND OF THE INVENTION

Although instrumentation, computers, and other hardware can be periodically pulled out of service for routine testing, or tested in place by connection to special test equipment, it is often preferable to provide a built-in, self-test capability within integrated circuits comprising such devices. Any problems that arise in the proper operation of the circuits are then identified much sooner than might occur as the result of a periodically scheduled test. In certain critical applications of integrated circuits, especially those involving human safety, improper operation of a circuit for even a brief time may be intolerable. For example, failure of integrated circuits used in aviation systems may pose a significant risk to the lives of all the passengers on an aircraft. Early detection of a problem in such a system as a result of a built-in, self-test capability can alert the crew of an aircraft about a failed component, so that corrective action can be taken.

Typically, a built-in, self-test capability in integrated circuits and other hardware devices is initiated each time that the device is first energized. For example, personal computers often initiate a random access memory test each time the computer is turned on or reset. Alternatively, self tests can be run on demand, either when a monitoring circuit detects an indication of a fault in a device or at periodic, timed intervals.

A possible fault condition is also readily detected in fault tolerant systems that use redundant components. For example, a typical fault tolerant system may include three identical signal processing circuits running in parallel and a "voter" to compare the signals from the three circuits in order to select one of the signals as an output. If the signal output from one of the redundant circuits differs from the signal output from the other two, the voter detects a fault condition, and would then normally use the signal from the two circuits that are in agreement as the system output signal. However, the two circuits producing the same output signal may both be faulty. To determine which circuit(s) are faulty, the voter can initiate a self test of all three circuits.

In the preceding example, a fault is detected during the normal operation of the fault tolerant system while the redundant circuits are perhaps processing a limited range of input signals, i.e., a subset of the full range of signals that could be input. It is entirely possible that a fault not detectable with the limited range or type of input signals currently being processed may exist in one of the circuits, lying latent and unrecognized for some time. Clearly, it is preferable to find all faults in a circuit before any fault becomes a problem. There is thus an inherent limitation in a system that performs a self test (on demand) only after a fault is detected, particularly where the fault is tentatively detected using the normal limited range or type of input signals rather than a full range of test signals.

Regardless of whether it is initiated at start up of a circuit, at periodic intervals, or on demand after a fault is tentatively detected, a conventional self test that uses a test signal input usually interrupts the normal operation and function of the circuit under test. This interruption continues until the self test is completed. While a circuit is undergoing a self test, it is unavailable to perform tasks that other parts of the system in which it is installed may require to function normally. For conventional, periodically initiated self tests of a circuit, the frequency with which the self tests are initiated thus represents a tradeoff between the efficiency and reliability of the circuit.

One way to avoid interrupting the normal operation of a circuit for a self test is to implement a random hit test. In this technique, a normal input signal is compared to a pseudorandom test signal that is generated in the background. If a match is achieved, the random "hit" causes the output signal of the circuit to be digitally compacted. The digitally compacted signal is then compared to the expected "signature" of the pseudorandom signal. Any discrepancies indicate a fault in the circuit. Attempts to quantify the reliability of such a system have shown that this scheme requires relatively long time intervals to develop complete and meaningful test results.

In signature check pointing tests, intermediate signatures of a circuit output signal are compared against expected values. To determine if the circuit is operating properly, the particular system operation leading to the test signature must be known and never change. For example, the correct functional operation of a processor can be evaluated or verified from the signature developed as a result of the processor carrying out certain operations. However, this technique has limited utility because the sequence of input and the operation of the circuit under test must be known and remain unaltered if the same signatures are to be produced every time by a properly functioning circuit.

In consideration of the above-noted problems with conventional self-test methods, it is an object of the present invention to carry out a self test of a circuit without interrupting its normal functional operation. Furthermore, it is an object to self test a circuit during a portion of each system clock cycle in which the circuit is not required to implement its normal functions. Yet a further object is to carry out the self test in increments, completing parts of the self test at times that the circuit is not required to carry out its normal function, and determining a signature for the result only after the self test is completed. Still a further object is to increase the reliability and fault isolation capability of fault tolerant voting systems. These and other objects and advantages of the present invention will be apparent from the attached drawings and the Description of the Preferred Embodiments that follows.

SUMMARY OF THE INVENTION

The present invention is a self-test system for use in testing a circuit that performs a primary function, including processing an input signal from a primary source to produce an output signal. Test generator means are provided in the system for producing a test signal used in evaluating the proper operation of the circuit. The system also comprises means for determining when the circuit is required to perform its primary function, including means for producing a self-test enable signal during an interval of time that the circuit is not required to perform its primary function. Multiplexer means in the system have a first input connected to the test generator means to receive the test signal and a second input connected to the primary source to receive the input signal applied to the circuit when it is performing its primary function. The multiplexer means are operative to respond to the self-test enable signal by connecting the test signal to the circuit in place of the input signal from the primary source, and in the absence of the self-test enable signal, are operative to connect the input signal from the primary source to the circuit. Test analysis means are connected to receive the output signal from the circuit, for determining if the circuit is operating properly as a function of the output signal produced by the circuit in response to the test signal. A self test of the circuit is only performed while the circuit is not performing its primary function and thus does not interfere with the primary function of the circuit.

The test analysis means comprise signature analyzer means for comparing an output signature of the circuit produced in response to the test signal to an expected signature to determine if the circuit is operating properly. Furthermore, the signature analyzer means comprise a data compactor that compacts the output signal of the circuit, producing a compacted signature, and a signature decoder for comparing the compacted signature with the expected signature.

In one embodiment of the invention, the circuit is fault tolerant and comprises a plurality of redundant modules, each of which redundantly performs the same primary function, including processing the input signal from the primary source to produce a module output signal. In this embodiment, the test analysis means comprise the voter means for comparing the module output signal from each module and selecting a specific module output signal for the circuit from among the module output signals, even if the module output signals are not the same and the voter means determine if the circuit is operating properly by comparing the module output signals produced by the modules in response to the test signal. The voter means comprise a pass/fail latch that latches a result signal indicating whether, in response to the test signal, the module output signals are all the same.

In another embodiment, the circuit comprises a pair of modules connected so that one of the modules selectively receives the input signal while the other module receives the test signal from the multiplexer means. A module output signal from each module is connected to output multiplexer means that are operative, in response to the test signal, to select the module output signal from the module that is receiving the input signal, and to supply that selected module output signal to a primary utilization device. The output multiplexer means also select the module output signal for application to the test analysis means.

The test analysis means can include means for storing data conveyed by the output signal of the circuit in response to the test signal during a portion of the self test. Consequently, a complete output signature can be determined when the self test is resumed and subsequently completed.

The self-test system can further include means for latching the output signal supplied to a primary utilization device immediately prior to the self-test enable signal so that the primary utilization device can continue to use that output signal during the self test.

In addition, the self-test system can comprise means for interrupting the test generator means and storing a state of the test generator means when interrupted so that the circuit can perform its primary function. When the circuit is again not required to perform its primary function, the self test can resume at a point where it is interrupted.

Another embodiment of the circuit comprises a plurality of modules connected in series. The self-test system in this instance further comprises a latch and stage multiplexing means having a plurality of inputs. At least one of the inputs is connected to an output of the latch and another of the inputs is connected to an output of a first module in the circuit. The stage multiplexing means are operative to selectively provide an input signal for a second module in the circuit in response to the test signal.

A method for implementing a self test of a circuit that performs a primary function, including processing an input signal from a primary source to produce an output signal, is another aspect of the present invention. The method includes steps generally consistent with the functions implemented by the above-described elements of the system.

DESCRIPTION OF THE PREFERRED EMBODIMENTS

Figure 1:
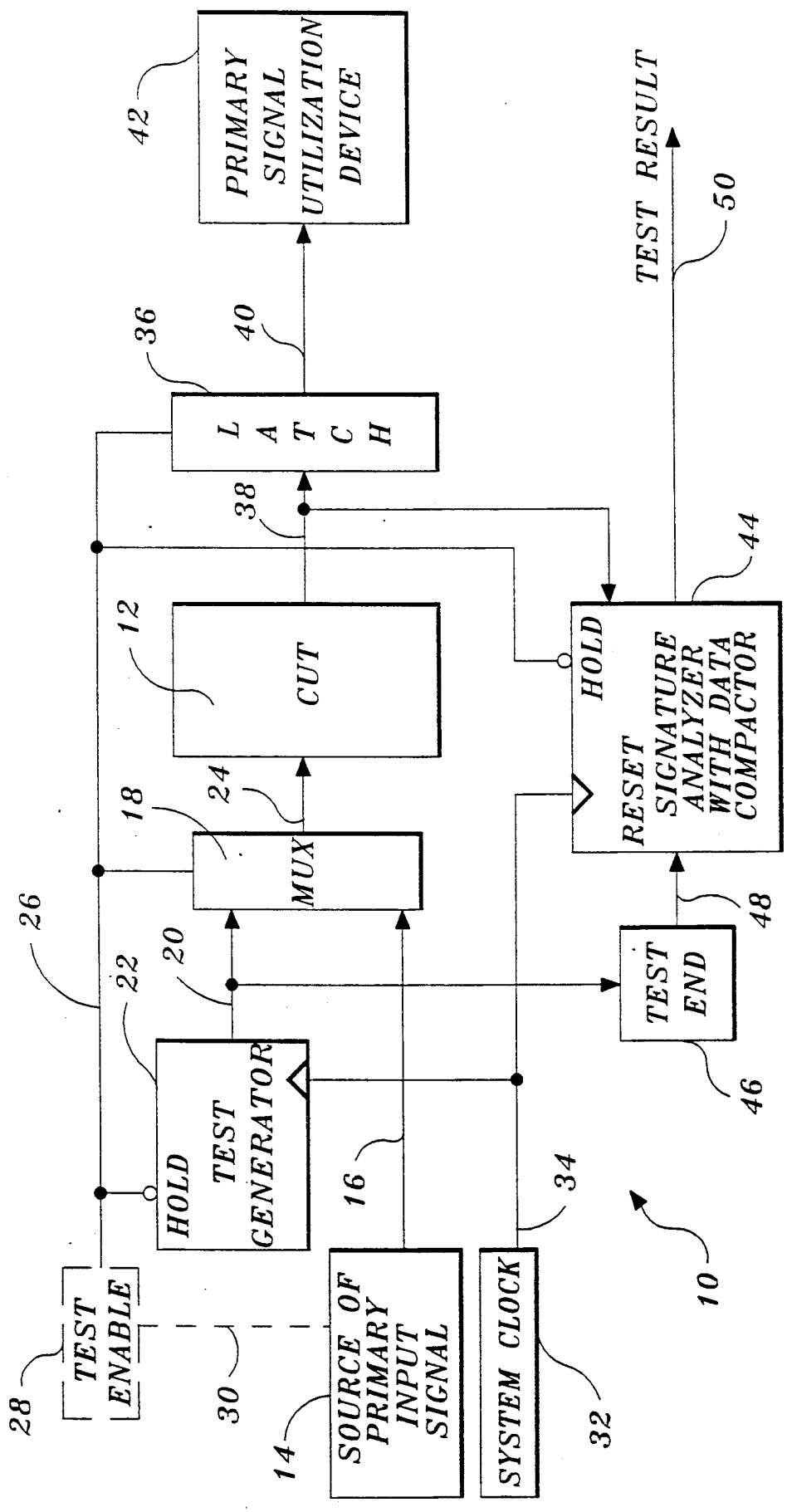
FIG. 1 is a schematic block diagram illustrating a first preferred embodiment of a self-test system in accordance with the present invention.

A first embodiment of a self-test system is shown generally at reference numeral 10 in FIG. 1. Self-test system 10 is used to test the operation and functionality of a circuit under test (CUT) 12, which may comprise virtually any type of circuit that processes an input signal, producing an output signal. Unlike conventional circuit test paradigms, which implement a test of a circuit either when the circuit is first energized, or upon demand according to a predetermined schedule that provides for testing of a circuit after it has been in operation for relatively long intervals of time, self-test system 10 can implement a self test of CUT 12 as often as each clock cycle of the system, or during any other interval in which CUT 12 is not required to perform its normal function.

A source 14 supplies a primary input signal to CUT 12 that it processes, producing an output signal. The input signal would normally be applied directly to CUT 12. In self-test system 10, a lead 16 insted conveys the input signal to a multiplexer 18. Multiplexer 18 is also connected to receive a test signal conveyed over a line 20 from a test generator 22. Test generator 22 produces test signals appropriate to test the functionality of CUT 12; however, it is not necessary that a full range of test signals be applied to CUT 12 during each test interval. Instead, during each clock cycle of the system or during multiple clock cycles while CUT 12 is not required to provide its primary function, different test signals can be successively applied to CUT 12. The nature of the test signals produced by test generator 22 depends upon the type of circuit under test and the functions performed by the circuit. Multiplexer 18 is connected to CUT 12 via a lead 24, which conveys either the test signal from test generator 22 or the primary input signal from source 14 to the circuit under test. Selection of the signal conveyed to CUT 12 by multiplexer 18 is controlled in response to a test enable signal, which is input to the multiplexer over a lead 26 from an optional test controller 28. Alternatively, the enable signal can be provided from CUT 12, from source 14, or from an external device (not shown). For example, test controller 28 may be connected to source 14 by an optional lead 30 that conveys data indicating whether CUT 12 is required to perform its primary function or is free to undergo a self test.

It will be apparent that CUT 12 can also provide the test enable signal based upon the type of function it is currently performing. Thus, if CUT 12 is a central processing unit and is currently being requested to process a NoOp function, it is free to instead undergo a self test. If the self tests are performed as part of each clock cycle, CUT 12 can also provide the test enable signal, based upon its determination of the portion of each clock cycle during which it is free to process a test signal.

A system clock 32 provides clock signals that are used for timing by CUT 12 (and by components of self-test system 10). These clock signals are conveyed over a lead 34 to test generator 22 and to a signature analyzer 44. It is preferable to use the system clock for controlling these elements of the self-test system in most cases, to avoid lack of synchronization between the self test and the normal functional operation of CUT 12. However, under some circumstances, it may be appropriate to provide a test clock (not shown) for timing test generator 22 and signature analyzer 44, which is different than system clock 32. One instance where a separate test clock may be desirable is the case where self test of CUT 12 occurs during portions of the system clock cycle in which the circuit is not performing its normal function. This type of self test, which is implemented during a part of a clock cycle, is referred to as "subcycle stealing" and may require finer incremental control that can only be obtained through use of a higher frequency test clock, as compared to system clock 32.

The signal output from CUT 12 as a result of processing either the normal input signal or the test signal is conveyed through a lead 38 to a latch 36. The function of latch 36 is to preserve the last state of the output signal from CUT 12 resulting from processing of the normal input signal just before the circuit enters the test mode. It may be important that the state of the output signal be preserved, particularly if other components downstream of CUT 12 use this signal. In FIG. 1, a primary signal utilization device 42 is connected to the output of latch 36 by a lead 40, and thus represents at least a first such component making use of the output signal from CUT 12 resulting from its processing of the normal input signal. Clearly, it is important to avoid providing spurious data to primary signal utilization device 42, such as might occur if the output from CUT 12 resulting from processing of the test signal were propagated directly over lead 40. Accordingly, latch 36 is controlled by the test enable signal conveyed over lead 26. By interposing latch 36 between the output of CUT 12 and primary signal utilization device 42, the input to latch 36 is free to change as CUT 12 undergoes the self test without impacting primary signal utilization device 42.

Test generator 22 responds to the test enable signal (which is inverted at input to the test generator) by producing the test signal applied to multiplexer 18. In response to the test enable signal, multiplexer 18 selects the test signal for input to CUT 12 rather than the normal input signal. The time required to complete an entire test sequence depends upon the system clock rate and on the amount of free time available to carry out the self test when CUT 12 is not required to perform its normal function. For example, if test generator 22 is designed to perform one thousand different tests on CUT 12 by supplying it with a different test signal during each system clock cycle and if system clock 32 runs at 20 megahertz, each test vector (different test signal) can be run in 50 nanoseconds, and the total of 1,000 test vectors could be run every 50 microseconds. Interruption of the self tests to enable CUT 12 to perform its normal function delays completion of the self-test sequence. Thus, if after 20 microseconds, CUT 12 is required to perform its normal function in processing an input signal conveyed on lead 16, the current test vector being generated by test generator 22 is held until CUT 12 completes its normal function, and thereafter, the self test continues with that test vector. Test generator 22 then generates the remaining test vectors in the sequence until a further interruption occurs or until the sequence is completed. Completion of the sequence causes a signal to be conveyed over lead 20 to a test end circuit 46, which provides a reset signal to signature analyzer 44 over a lead 48.

As CUT 12 processes each test vector and produces a corresponding output signal, signature analyzer 44 receives the output signal over lead 38 for processing to produce a signature. Signature analyzer 44 includes a data compactor (not separately shown) that produces a compacted signature corresponding to the signal input to the signature analyzer. Each successive output signal from CUT 12 thus updates the compacted signature (e.g., by carrying out an exclusive or with the preceding signature), which is retained in the signature analyzer, so that at the end of the test sequence, a final compacted signature for the entire test sequence is available for comparison to a predetermined expected signature. The signature analyzer also includes a signature decoder (not shown) that compares the final compacted signature to the predetermined expected signature. The expected signature has previously been determined in respect to a model, or by running a CUT that is known to be operating properly to compute the final compacted signature of the test sequence. Results of the comparison of the signature produced at the end of the test sequence with the expected signature provides a test result which is output over a lead 50 and can be used to alert a user that CUT 12 has failed the test sequence if the final compacted signature does not match the expected signature.

Instead of producing a test result that defines the operational status of CUT 12 only in respect to a lengthy test sequence, it is also possible to provide a series of test sequences, which separately test various functions of CUT 12, each of the series of test sequences having a predetermined expected signature associated with it. Signature analyzer 44 can then compare the actual test sequence compacted signature for that particular series of test vectors to the corresponding predetermined expected signature to produce a test result for each test sequence. These test results can indicate specific functions that CUT 12 has failed to perform properly, should the actual signature for one of the test sequences fail to match the corresponding expected signature for that test sequence. At the end of each test sequence (or the entire test sequence), after the comparison is complete and the results output, the reset signal applied to signature analyzer 44 clears the final signature, preparing the signature analyzer to determine a signature for the next output signal received from CUT 12 in response to the first test vector of the next test sequence.

Figure 2:
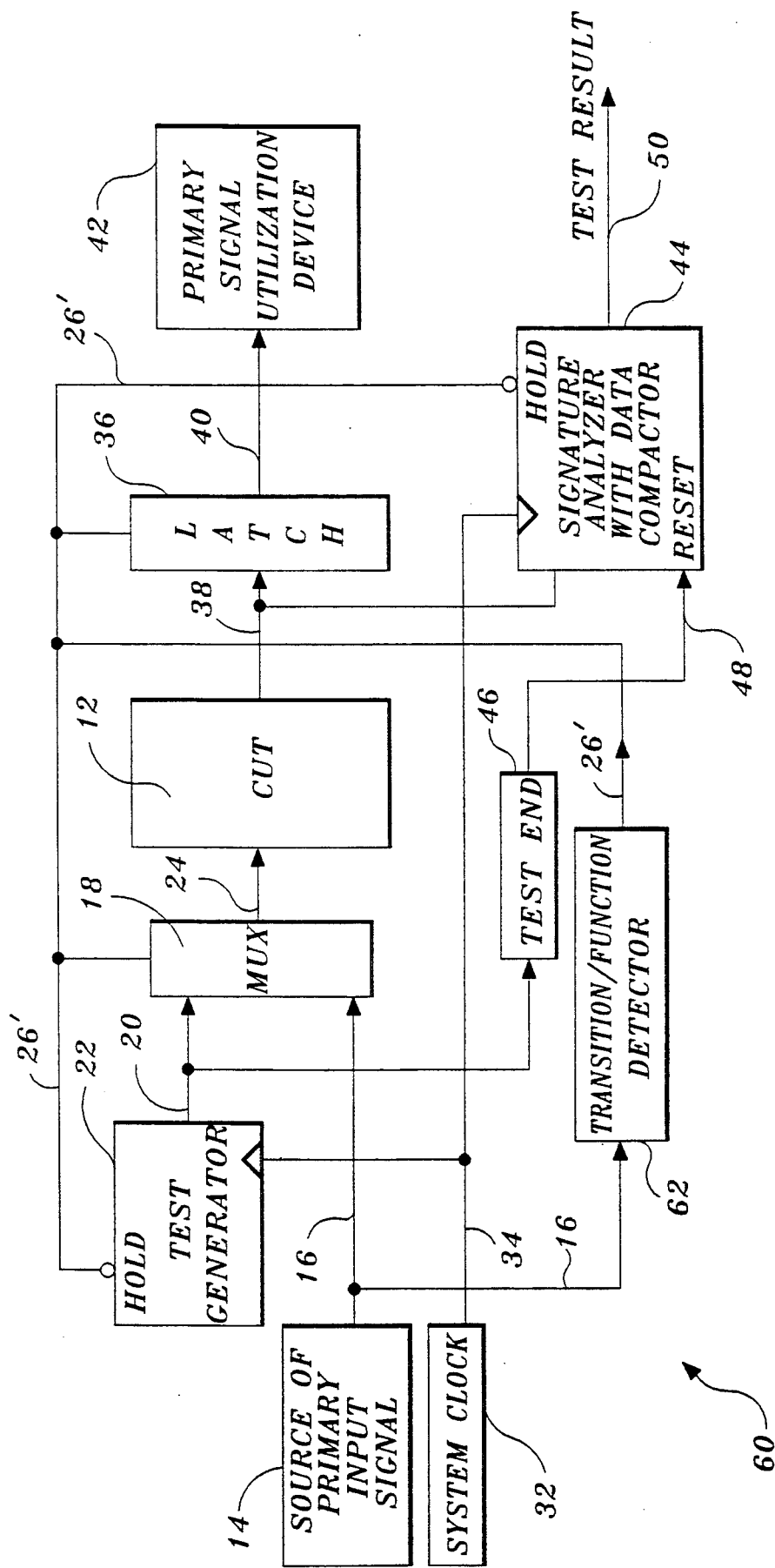
FIG. 2 is a schematic block diagram showing a second embodiment of the self-test system, with the capability to internally generate a test signal.

In FIG. 2, a second embodiment of the self-test system is shown generally at reference numeral 60. Self-test system 60 is very similar to self-test system 10, differing only in respect to the generation of a test enable signal, which is applied through a lead 26' to test generator 22, multiplexer 18, latch 36, and signature analyzer 44. Instead of externally generating the test enable signal, self-test system 60 includes a transition/function detector 62, which monitors the normal input signal applied to CUT 12 from source 14. Transition/function detector 62 is operative to detect input signals that do not require processing by CUT 12, such as the NoOp command. Alternatively, if each function performed by CUT 12 is completed within a critical portion of each clock cycle, transition/function detector 62 can enable the self test only after that critical portion of each clock cycle has passed. With this technique, subcycle stealing self tests are readily effected during each clock cycle.

Figure 3:
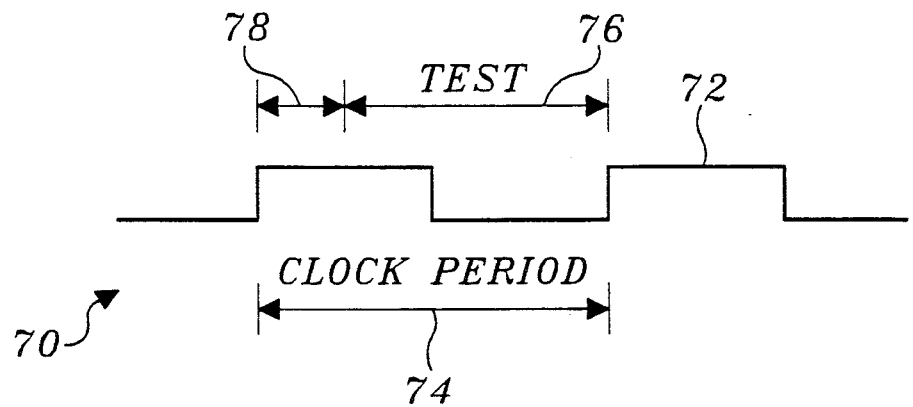
FIG. 3 is a timing diagram showing the relationship between the self-test period and one system clock period.

FIG. 3 graphically illustrates how this technique is implemented. A clock signal 72 is shown having a clock period 70, which is represented by the length of an arrow 74. The interval of each clock period is divided into two parts, including a self-test portion represented by an arrow 76, and a critical portion represented by an arrow 78 (at the beginning of the clock cycle), during which CUT 12 performs its normal function. It will be apparent from this illustration that a substantial amount of time is available for implementing a sequence of test vectors, performing each test vector during one of the clock cycles.

Figure 4:
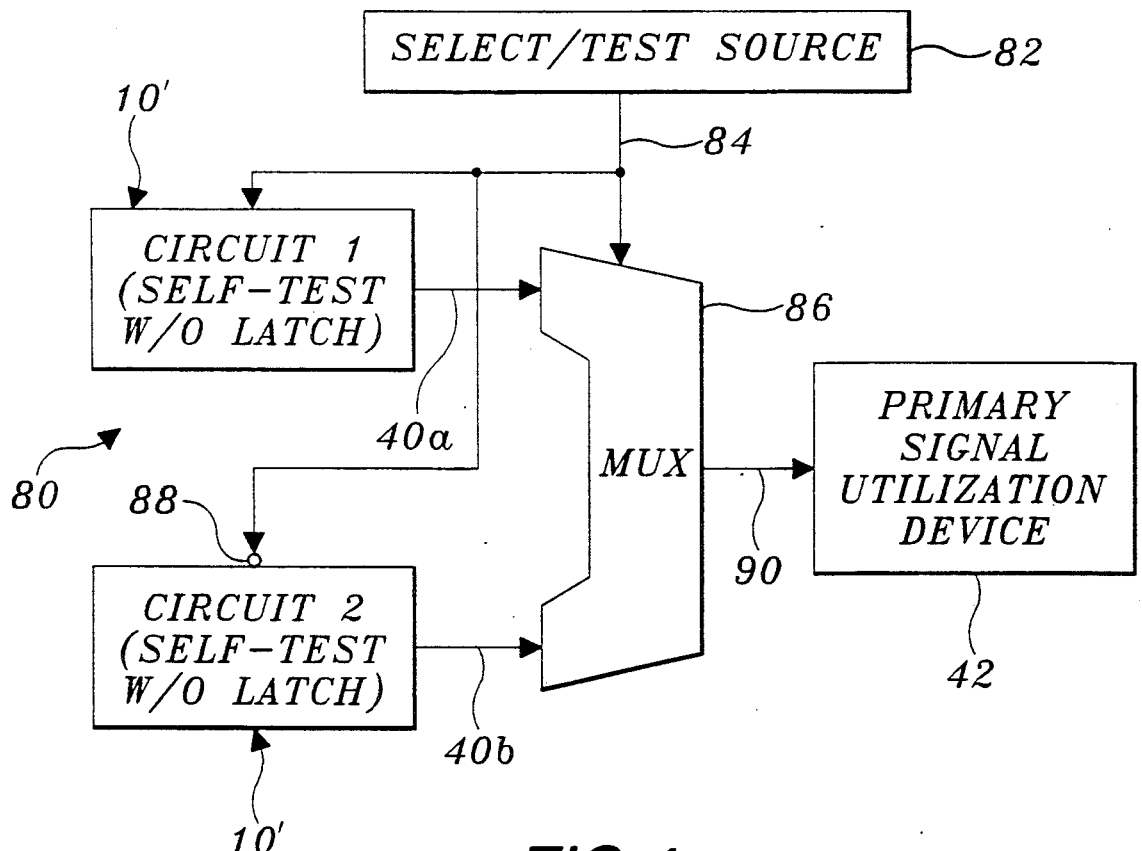
FIG. 4 is a schematic block diagram of a configuration of parallel circuits that alternately perform a primary function and undergo self testing.

Latch 36 was included in self-test system 10 to prevent propagation of spurious data downstream to primary signal utilization device 42 during the self test of CUT 12. However, latch 36 may be omitted if the signal output from CUT 12 is connected in series to circuit elements that are inactive while CUT 12 is not performing its normal function. Latch 36 can also be omitted if the normal output signal is available from an alternative source. FIG. 4 shows a self-test system 80 comprising two circuits 10', each having a self-test capability like self-test system 10, except for the omission of latch 36. In self-test system 80, a select/test source 82 provides a select/test signal over a lead 84 to both self-test circuits 10'. However, this signal is inverted at its input to the second self-test circuit 10'. In this case, it is assumed that both of the self-test circuits have parallel input signals, so that either can function to provide an output signal to primary signal utilization device 42. Select/test source 82 can comprise simply a flip-flop connected to the system clock, so that its output signal changes state during each cycle of the system clock. In this way, each of the self-test circuits 10' alternately functions in its normal manner to produce an output signal while the other self-test circuit is processing a test signal.

The output of the circuit under test within each of self-test circuits 10' is respectively applied to a lead 40a and a lead 40b, which are connected to a multiplexer 86. Multiplexer 86 alternates between the output signals conveyed over leads 40a and 40b, causing the signal from the self-test circuit that is operating with its normal input signal to be output through a lead 90, which is connected to primary signal utilization device 42. Since multiplexer 86 is controlled by the select/test signal, just as are self-test circuits 10', an appropriate output signal is always supplied to the primary signal utilization device and the self-test circuits are thus able to carry out a test of CUT 12 in each self-test circuit 10' without use of a latch to maintain the state of the output signal.

Figure 5:
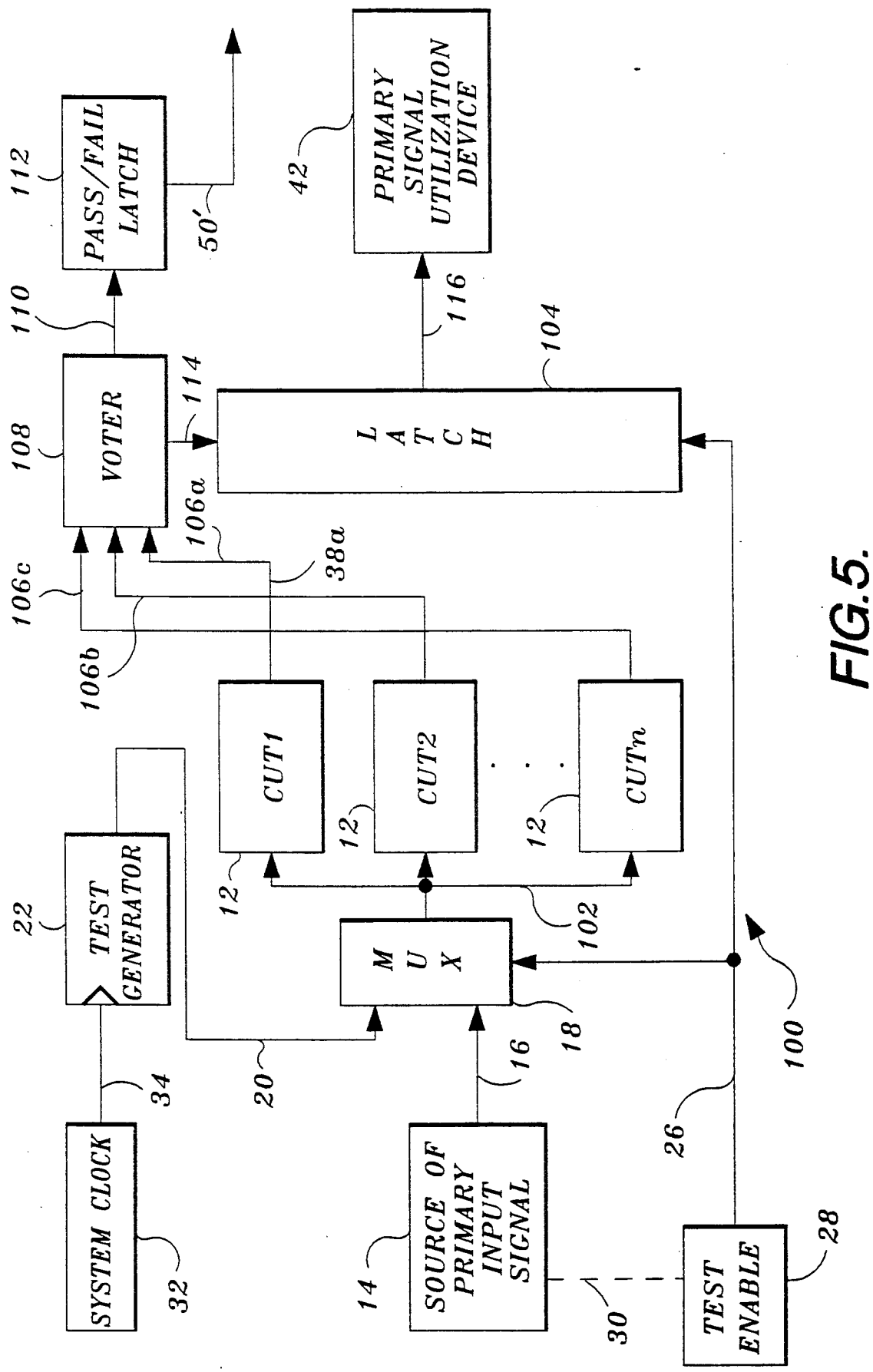
FIG. 5 is a schematic block diagram of a third embodiment of a self-test system comprising a fault tolerant configuration with multiple redundancy.

A different type of redundant self-test system is shown generally at reference numeral 100 in FIG. 5. In self-test system 100, a plurality of redundant CUTs 12 are all connected to receive either a normal input signal from source 14 or a test signal from test generator 22, depending upon the input selected by multiplexer 18. The output of multiplexer 18 is connected in parallel to each of CUTs 12 through a signal lead 102. The test enable signal discussed in respect to the preceding embodiments is applied to multiplexer 18 to control whether the normal input signal or the test signal is supplied to the CUTs. Test controller 28 only provides the test enable signal at such times that the CUTs are not required to carry out their function of processing the normal input signal, which can optionally be determined by signals supplied over optional lead 30 from source 14.

Since each of CUTs 12 processes the same input signal, i.e., either the normal input signal or the test signal, at the same time, their output signals should be equivalent. However, one or more of CUTs 12 may become defective, causing the output signal produced thereby to differ from the output signals of the other CUTs 12 that continue to operate properly. The output signals produced by the CUTs are conveyed over leads 106 to a voter 108, which follows predefined rules in selecting an output signal. In the event that the signal supplied over leads 106 are not all the same, voter 108 selects the output signal provided by the majority of the CUTs. The selected signal is supplied to a latch 104 over a lead 114 from voter 108 and is supplied over a lead 116 to primary signal utilization device 42.

During a self test of CUTs 12 in self-test system 100, the test enable signal is applied to latch 104, causing it to maintain the previous output signal on lead 116, preventing a spurious signal being supplied to primary signal utilization device 42 as a result of the test signals supplied by test generator 22 being processed by CUTs 12. Alternatively, the test enable signal can be applied to voter 108, inhibiting it from transferring the selected output signal to latch 104 when the output signal is the result of the CUTs processing a test signal.

Since voter 108 can detect a difference in the output signals supplied by all of the CUTs both while processing the normal input signals supplied by source 14 and while processing the test signals supplied by test generator 22, failure of one or more of the CUTs to operate properly can be detected during their normal operation in the system—and during self test. Nevertheless, there is an advantage in running a self test of the CUTs using specific test signals, since a sequence including a full range of test signals can be employed to completely evaluate all possible functions of CUTs 12. A normal input signal supplied to the CUTs may remain generally constant for extended periods of time or have only a limited range of variation, such that proper operation of all functions of the CUTs is not evaluated while they process the normal input signal. By supplying a full range of test signals that evaluates all of the functions and capabilities of CUTs 12, a defect in one of the CUTs can be detected much earlier, before that defect or failure becomes critical to the operation of the entire system.

Voter 108 is connected through a lead 110 to a pass-/fail latch 112. Pass/fail latch 112 may comprise, for example, a single bit latch that only keeps track of the last test result supplied by voter 108. Alternatively, pass/fail latch 112 can comprise a plurality of gates that determine whether or not at least one test vector failed in the course of the entire test sequence. In an even more complex arrangement, voter 108 and pass/fail latch 112 can be replaced by a plurality of signature analyzers (one for each CUT 12) that evaluate the proper operation of the CUTs during each clock period using subcycle clock stealing. In any case, the results of the self-test are available on a lead 50', for use in indicating to a user that a failure of one of the CUTs 12 has occurred.

Figure 6:
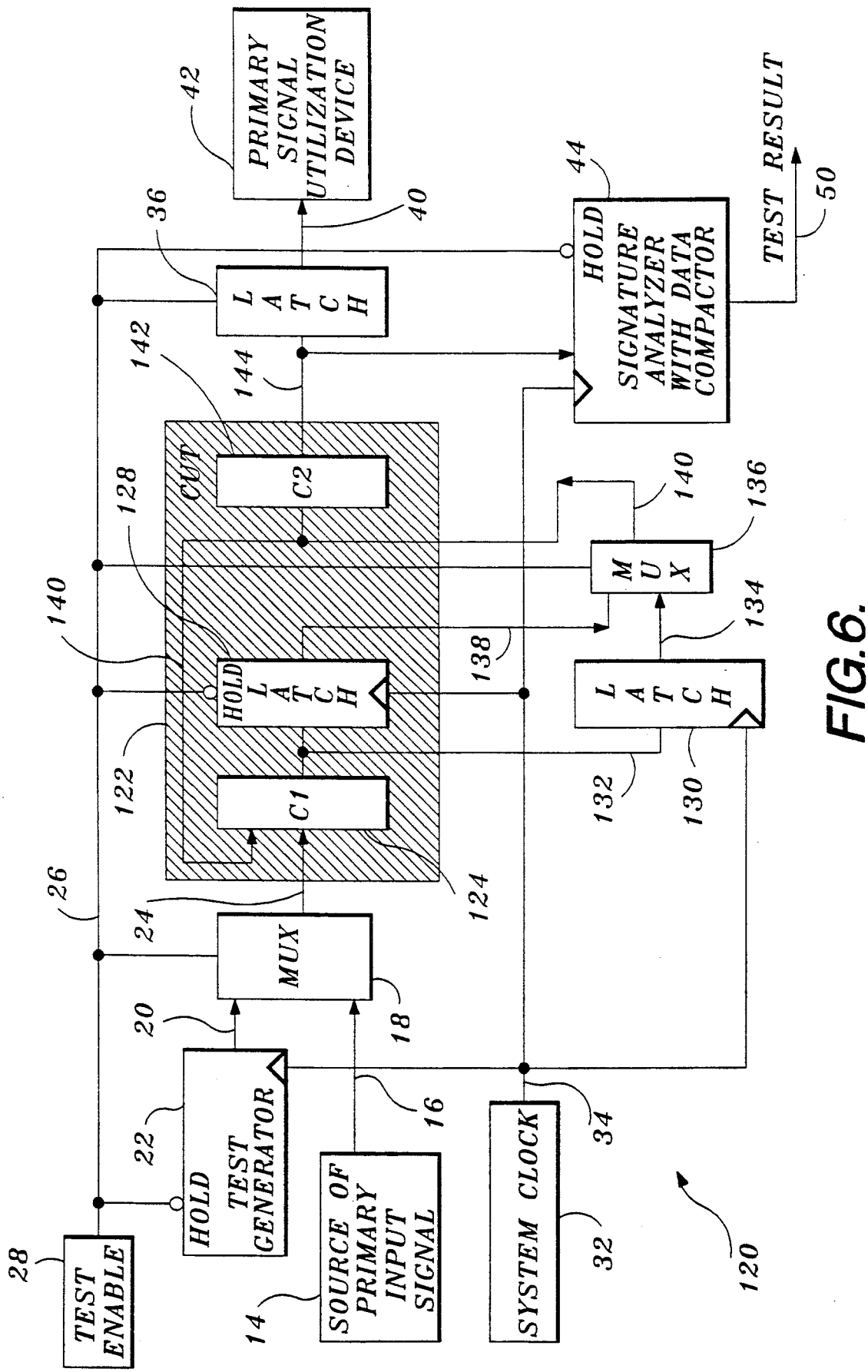
FIG. 6 is a schematic block diagram of a fourth embodiment in which the circuit under test comprises sequentially connected portions.

In each of the preceding embodiments, self-test systems 10, 80, and 100 have included CUTs 12 in which an input signal is processed to produce an output signal without storing an intermediate result within the CUT. It should be apparent that additional steps must be taken to implement the self-test technique as described above in respect to a CUT in which a stored data state exists, since the condition of the stored data state is likely to change as a result of the CUT processing the test signal, causing the next normal input signal processed by the circuit to produce an output signal that is in error. In consideration of this problem, FIG. 6 shows a self-test system 120 that includes a CUT 122 in which a stored data state corresponding to the output signal of a first portion 124 (C1) of the circuit is maintained in a latch 128. Normally, the output signal from latch 128 would be applied directly to a second portion 142 (C2) of CUT 122; however, in self-test system 120, the signal output from latch 128 is connected through a lead 138 to one input of an external multiplexer 136. The signal from first circuit portion 124 is conveyed through a lead 132 as an input to a latch 130, which has an output connected through a lead 134 to one of the inputs of multiplexer 136. Latch 130 is connected through lead 34 to system clock 32 so that it latches the signal on lead 132 at the beginning of each clock cycle.

The output from multiplexer 136 is conveyed through a lead 140 to the input of second circuit portion 142 and also feeds back into first circuit portion 124. The output signal from second circuit portion 142 is applied through a lead 144 to latch 36 and also to signature analyzer 44. Latch 36 is controlled by the test enable signal, which operates as previously described to maintain the state of the last output signal that resulted from CUT 122 processing its normal input signal. The test enable signal thus controls the output signal from test generator 22, the operation of multiplexer 18 and signature analyzer 44, and the operation of latches 36 and 128.

Test controller 28 responds to a requirement for CUT 122 to process the normal input signal from source 14 by storing the state of the current test signal output from test generator 22, and by causing multiplexer 18 to provide the normal input signal to CUT 122. First circuit portion 124 processes the normal input signal, producing an output signal that is held on latch 128 and on latch 130. At the beginning of the next system clock signal produced by system clock 32, multiplexer 136 conveys the output signal from first circuit portion 124 to the input of second circuit portion 142, which in turn produces an output signal held by latch 36, for use by primary signal utilization device 42.

When test controller 28 determines that CUT 122 is not required to perform its normal function, it produces a test enable signal that releases the hold on test generator 22, allowing it to produce a test signal input to multiplexer 18. Also in response to the test enable signal, multiplexer 18 provides the test signal as an input to first circuit portion 124. The output of first circuit portion 124 resulting from processing the test signal is held by latch 130, but in response to the test enable signal (inverted), which is connected to control latch 128, latch 128 continues to store the previous output signal from first circuit portion 124 that resulted from processing the normal input signal. Multiplexer 136 responds to the test enable signal, selecting the signal supplied by latch 130 as an input to second circuit portion 142, causing it to produce an output signal that is applied to signature analyzer 44. Latch 36 continues to hold the output signal developed by second circuit portion 142 when it was operating to perform its normal function prior to undergoing the self test. As a result, the primary utilization device continues to receive the same output signal and is not affected by spurious data resulting from CUT 122 processing the test signal.

Signature analyzer 44 compacts the data, producing a test result indicating whether or not the signature of the compacted data corresponds to an expected signature that was previously determined, as discussed above. The test result from this comparison is output over a lead 50, for use in alerting the operator in the event that a failure of CUT 122 is detected.

When CUT 122 is next required to perform its normal function, test controller 28 responds by changing the state of the test enable signal so that the output of test generator 22 is held in its current state, latch 128 is freed to latch the next output signal from first circuit portion 124, and multiplexer 136 selects the output of latch 128 for input to second circuit portion 142. CUT 122 can then process the normal input signal, thereby carrying out its intended function.

As an alternative to the technique employed by self-test system 120, a self test could be performed separately on each of first circuit portion 124 and second circuit portion 142. However, additional circuitry is then required to implement the self test, since a different test signal is required for each circuit portion.

While the present invention has been disclosed in respect to several preferred embodiments and modifications thereto, those of ordinary skill in the art will appreciate that further changes can be made to the invention within the scope of the claims that follow below. Accordingly, it is not intended that the scope of the present invention be in any way limited by the disclosure of the preferred embodiments, but instead that it be determined entirely by reference to the claims.

The embodiments of the invention in which an exclusive property or privilege is claimed are defined as follows:

1. A self-test system for use in testing a circuit that performs a primary function, the primary function including processing an input signal from a primary source to produce an output signal, said self-test system comprising:
   (a) test generator means for producing a test signal used in testing the operation of the circuit;
   (b) self-test enable means for determining when the circuit is required to perform its primary function and producing a self-test enable signal during an interval of time that the circuit is not required to perform its primary function;
   (c) multiplexer means, having a first input connected to the test generator means to receive the test signal, a second input connected to the primary source to receive the input signal applied to the circuit when it is performing its primary function, and a third input connected to said self-test enable means to receive said self-test enable signal, for responding to the self-test enable signal by connecting the test signal to the circuit in place of the input signal from the primary source, and in the absence of the self-test enable signal, operative to connect the input signal from the primary source to the circuit; and
   (d) test analysis means connected to receive the output signal from the circuit, for determining if the circuit is operating properly as a function of the output signal produced by the circuit in response to the test signal, whereby a self test of the circuit is only performed while the circuit is not performing its primary function and thus does not interfere with the primary function of the circuit.

2. The self-test system of claim 1, wherein the test analysis means comprise signature analyzer means for comparing an output signature of the circuit produced in response to the test signal to an expected signature to determine if the circuit is operating properly.

3. The self-test system of claim 2, wherein the signature analyzer means comprise a data compactor that compacts the output signal of the circuit, producing a compacted signature, and a signature decoder for comparing the compacted signature with the expected signature.

4. The self-test system of claim 2, wherein the test analysis means include means for storing data conveyed by the output signal of the circuit in response to the test signal, during a portion of the self test, so that a final output signature can be determined when the self test is resumed and subsequently completed.

5. The self-test system of claim 1, wherein the circuit is fault tolerant and comprises:
   a plurality of redundant modules, each of which redundantly performs the same primary function, including processing the input signal from the primary source to produce a module output signal.

6. The self-test system of claim 5, wherein the test analysis means comprise the voter means for comparing the module output signal from each module and selecting a specific module output signal for the circuit from among the module output signals, even if the module output signals are not the same and the voter means determine if the circuit is operating properly by comparing the module output signals produced by the modules in response to the test signal.

7. The self-test system of claim 6, wherein the voter means comprises a pass/fail latch that latches a result signal indicating whether, in response to the test signal, the module output signals are all the same.

8. The self-test system of claim 1, wherein the circuit comprises a pair of modules connected so that one of the modules selectively receives the input signal while the other module receives the test signal from the multiplexer means, a module output signal from each module being connected to output multiplexer means that are operative, in response to the test signal, to select the module output signal from the module that is receiving the input signal and supplying that module output signal to a primary utilization device, and to select the module output signal from the module that is receiving the test signal for application to the test analysis means.

9. The self-test system of claim 1, further comprising means for latching the output signal supplied to a primary utilization device immediately prior to the self test in response to the self-test enable signal so that the primary utilization device can continue to use that output signal during the self test.

10. The self-test system of claim 1, further comprising means for interrupting the test generator means, and wherein the test generator means are operative to store a state of the test generator means when it was interrupted so that the circuit can again perform its primary function and then resume the self test with the stored state at a point where the self test was interrupted, after the circuit is again not required to perform its primary function.

11. The self-test system of claim 1, wherein the circuit comprises a plurality of modules connected in series, further comprising a latch, and stage multiplexing means having a plurality of inputs, at least one of which is connected to an output of the latch and at least another of which is connected to an output of a first module in the circuit, for selectively providing an input signal for a second module in the circuit in response to the test signal.

12. The self-test system of claim 1, wherein the circuit performs its primary function during a portion of a clock cycle used to time the circuit, and wherein the self-test of the circuit is accomplished during at least a portion of the remainder of the clock cycle, thereby effectively stealing that portion of the remainder of the clock cycle to implement the self test of the circuit without interference with the circuit's primary function.

13. A method for implementing a self test of a circuit that performs a primary function, the primary function including processing an input signal from a primary source to produce an output signal, the method comprising the steps of:
   (a) producing a test signal to test the operation of the circuit;
   (b) determining when the circuit is required to perform its primary function and producing a self-test enable signal during a time that the circuit is not required to perform its primary function;
   (c) in response to the self-test enable signal, connecting the test signal to the circuit in place of the input signal from the primary source;
   (d) in the absence of the self-test enable signal, connecting the input signal from the primary source to the circuit; and (e) determining if the circuit is operating properly as a function of the output signal produced by the circuit in response to the test signal, whereby a self test of the circuit is only performed while the circuit is not performing its primary function and thus does not interfere with the primary function of the circuit.

14. The method of claim 13, wherein the step of determining if the circuit is operating properly comprises the step of comparing an output signature of the circuit produced in response to the test signal to an expected signature, and if they are the same, determining that the circuit is operating properly.

15. The method of claim 14, further comprising the steps of compacting the data and determining the signature of the compacted data for comparison to the expected signature.

16. The method of claim 14, further comprising the steps of storing data conveyed in the output signal of the circuit produced in response to the test signal, during a portion of the self test, and subsequently resuming the self test after an interruption, using the stored data to determine the output signature for the complete self test.

17. The method of claim 13, wherein the circuit is fault tolerant, comprising a plurality of redundant modules, each of which redundantly performs the same primary function, and wherein the step of determining if the circuit is operating properly comprises the step of comparing a module output signal from each of the modules that is produced by them in response to the test signal, and determining that the circuit is operating properly if the module output signals are all the same.

18. The method of claim 17, further comprising the step of latching a result signal from the comparison of the module output signals that indicates whether they are all the same.

19. The method of claim 13, wherein the circuit comprises a pair of modules, one of which selectively receives the test signal and the other of which receives the input signal from the primary source, further comprising the step of selecting the output signal from the module that is receiving the test signal for determination of whether that module is operating properly and selecting the output signal from the other module that is receiving the input signal from the primary source, for application to a primary utilization device.

20. The method of claim 13, further comprising the step of latching the output signal supplied by the circuit in response to the input signal from the primary source so that a primary utilization device can continue to use that output signal during the self test.

21. The method of claim 13, wherein if the self test is interrupted so that the circuit can again perform its primary function, further comprising the step of storing a state of the test signal so that the self test can again resume with that state when the circuit is again no longer required to perform its primary function.

* * * * *